INVENTORS:
James K. Duncan
BY James L. Quinn
Wolfe, Hubbard, Voit & Osann
Attys

INVENTORS:
James K. Duncan
James L. Quinn
BY
Wolfe, Hubbard, Voit & Osann
Attys

INVENTORS:
James K. Duncan
BY James L. Quinn

Wolfe, Hubbard, Voit & Osann
Attys

April 30, 1963 J. K. DUNCAN ETAL 3,087,612

DOCUMENT SORTING APPARATUS

Filed Sept. 15, 1960 12 Sheets-Sheet 4

INVENTORS:
James K. Duncan
BY James L. Quinn

Wolfe, Hubbard, Voit & Osann
Attys

April 30, 1963 J. K. DUNCAN ETAL 3,087,612

DOCUMENT SORTING APPARATUS

Filed Sept. 15, 1960 12 Sheets-Sheet 5

INVENTORS:
James K. Duncan
BY James L. Quinn

Wolfe, Hubbard, Voit & Osann Att'ys.

INVENTORS:
James K. Duncan
James L. Quinn
BY Wolfe, Hubbard, Voit & Osann Attys.

April 30, 1963 J. K. DUNCAN ETAL 3,087,612

DOCUMENT SORTING APPARATUS

Filed Sept. 15, 1960 12 Sheets-Sheet 7

INVENTORS:
James K. Duncan
BY James L. Quinn

Wolfe, Hubbard, Voit & Osann Att'ys

INVENTORS:
James K. Duncan
BY James L. Quinn

Wolfe, Hubbard, Voit & Osann
Att'ys

April 30, 1963 J. K. DUNCAN ETAL 3,087,612

DOCUMENT SORTING APPARATUS

Filed Sept. 15, 1960 12 Sheets-Sheet 9

INVENTORS:
James K. Duncan
BY James L. Quinn

Wolfe, Hubbard, Voit & Osann
Attys

INVENTORS:
James K. Duncan
BY James L. Quinn
Wolfe, Hubbard, Voit & Osann
Attys

INVENTORS:
James K. Duncan
BY James L. Quinn
Wolfe, Hubbard, Voit & Osann, Attys

DOCUMENT SORTING APPARATUS

INVENTORS:
James K. Duncan
BY James L. Quinn

Wolfe, Hubbard, Voit & Osann Att'ys

United States Patent Office 3,087,612
Patented Apr. 30, 1963

3,087,612

DOCUMENT SORTING APPARATUS

James K. Duncan, Park Ridge, and James L. Quinn, Chicago, Ill., assignors to Cummins-Chicago Corp., Chicago, Ill., a corporation of Illinois Filed Sept. 15, 1960, Ser. No. 56,293
19 Claims. (Cl. 209—74)

This invention relates in general to the art of business machines, and in particular to apparatus for sorting documents according to numerical or alphabetical characters represented by indicia thereon. Modern accounting and bookkeeping procedures frequently require the handling and processing of a great number of documents such as checks, deposit slips, payment coupons, and the like. Since these are often received at diverse locations and in random order, it is often necessary or desirable to accurately sort them into various groups according to account numbers, amounts, dates or other information represented by characters thereon. Such sorting facilitates posting, totalling, verifying and other bookkeeping operations.

To keep sorting machines reasonable in cost, size and complexity, they are usually constructed to sort documents according to characters appearing in one field or digit place. For example, assume that documents within a certain group are individually numbered with account numbers from 0001 to 9999. To locate those documents having numbers between 6800 and 6899, i.e., the "6800 series," the group of documents would first be sorted according to the single character or numeral appearing in the first digit place. This would result in ten subgroups of documents respectively containing numbers from 0 to 999. 1000 to 1999, 2000 to 2999, etc. That particular group having account numbers between 6000 and 6999 would then be re-sorted according to the character appearing in the second digit place to obtain ten additional subgroups. Those in the "8" collection of second subgroups would thus constitute the desired documents having account numbers between 6800 and 6899. Further sorting on the basis of numerals in the third digit place could then be carried out, if desired.

From the foregoing illustration, it will be apparent that one of the desirable capabilities of a sorter is to sort on the basis of the characters or numerals which appear at a particular, selectable digit place or location in a composite, multi-place "word" or number.

It is the general aim of the present invention to bring forth an improved document sorter characterized not only in that documents are traversed so that a linear array of character fields on each moves lengthwise, but more importantly by a simple and advantageous structural organization for sorting documents according to characters appearing at any selected digit place or field on the respective documents.

One important object of the invention is to increase the speed and sorting by selectively diverting documents moving in closely spaced succession along a predetermined path, the diverting means being actuated some time after the character has been read on a document and just before the document reaches the diverting means.

A further object of the invention is to eliminate completely the need for variable time delay devices or character counting means in apparatus which sorts documents according to characters in any selected field as a linear array of fields is moved lengthwise, and instead to accomplish such sorting with simple, fixed delay means.

It is another object to obtain such selective sorting in apparatus which moves documents so that any array of fields travels lengthwise by the simple step of selectively adjusting or positioning a movable member, all components of the apparatus otherwise being unchanged and operating in the same way to sort documents according to characters in different fields or digit places.

Still another object of the invention is to provide for quick and convenient selection of any digit place or field whose character contents are to determine the sorting of documents, and particularly by displaying to an operator at all times just which of several fields has been selected.

An additional object is to provide a simple and rugged device for creating fixed, differently valued time delay intervals between the instant that respective characters are read and the instant that respective diverters, each corresponding to one character, are actuated.

Although the invention in its broadest aspects is not limited to sorters which "read" characters represented by a particular form of indicia or code, it is nevertheless an important object of the invention to provide sorting apparatus which distinguishes and sorts documents having characters represented thereon by visually legible patterns of perforations.

Other objects and advantages will become apparent as the following description proceeds, taken in conjunction with the accompanying drawings, in which.

While the invention has been shown and will be described in some detail with reference to a particular embodiment thereof, there is no intention that it thus be limited to such detail. On the contrary, it is intended here to cover all modifications, alternatives, and equivalents falling within the spirit and scope of the invention as defined by the appended claims.

Figure 2:
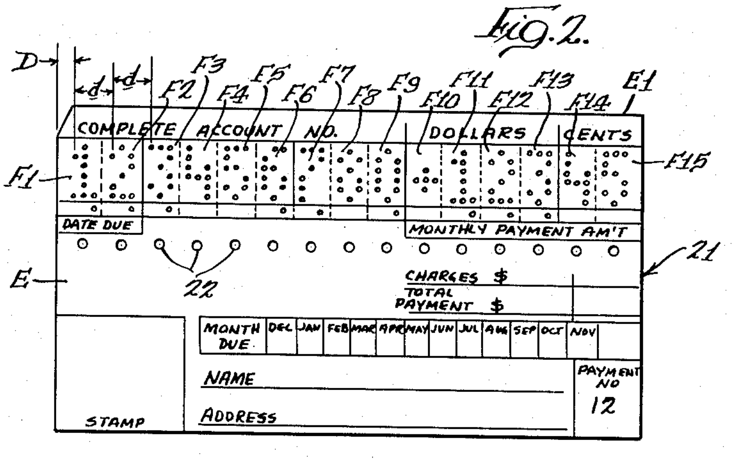
FIG. 2 illustrates a typical business document which is handled and sorted in the machine of FIG. 1.

To facilitate a better understanding of the sorting apparatus, it will be helpful to consider a typical document which is to be handled and sorted. As shown in FIG. 2, such a document may, for example, be a time payment coupon 21 returned to a bank or other commercial establishment with a customer's monthly payment. Certain information may be printed or written in the usual way on the coupon, while other data particularly important in bookkeeping operations is represented by indicia, either coded or visually legible, located in a linear array of character fields. For purposes of explanation, the coupon 21 has been shown as having fifteen areas or fields F1–F15, each of which may contain indicia representing any one of a plurality of *m* characters.

In the present instance, the plurality of *m* characters are ten in number, i.e., the numerical characters 0 through 9. Any one of these characters may appear in each document field. Moreover, each character is represented in visually legible form by indicia which is here shown as patterns of perforations punched at certain locations within each field. The coupon 21 thus has a line or row of fields F1—F15 extending across the top portion thereof, each field in the present instance being generally rectangular and containing perforations which represent one of the numerals 0 through 9.

Figure 4:
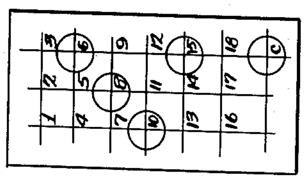
FIG. 4 illustrates a character field formed by a 3 by 6 rectangular array of eighteen stations, and also indicates the particular significant stations which are sensed to determine the identity of any character.

FIG. 4 shows one character field. It has eighteen stations or locations at which a perforation may be either present or absent. These 18 stations are arranged in a 3 x 6 rectangular array, and may for purposes of description be individually designated by the numbers 1–18 shown in FIG. 4. An additional perforation station *c* is disposed at the lower right corner of the array, and may be perforated or unperforated in order to provide for greater accuracy in reading or identifying the different numerical characters. As shown in FIG. 4, five of the perforation stations, i.e., stations 6, 8, 10, 15 and *c*, are designated as significant locations, since different combinations of perforations appearing in these particular stations will uniquely identify the ten numerals 0 through 9. This is confirmed by FIG. 3 which shows the pattern of perforations in a field to represent the different characters 0 through 9. It will be seen that each of these characters has perforations at a different or unique combination of significant locations. Of course, while in the illustrative form of the invention five particular stations have been designated "significant," those skilled in the art will appreciate that other combinations of stations can be utilized where desired. For example, the character "1" has perforations at significant stations 8 and *c*, while none of the other characters has perforations at only these two significant locations. By sensing the presence or absence of perforations in the five significant locations within any field, the identity of any character represented in that field may be "read" and identified by apparatus such as that disclosed and claimed in the copending application of James L. Quinn, Serial No. 768,396, filed October 30, 1958, now Patent No. 3,033,448.

The fields F1 and F2 in the coupon 21 (FIG. 2) contain perforations representing the two-digit number "12" signifying that the due date for payment is the 12th of the month. The fields F3—F9 contain perporations representing the seven digit number "3456780," which is the customer's account number. Finally, the fields F10—F15 contain perforations representing the amount, "+123.45," which is remitted to the bank with the coupon.

As indicated previously, the fields F1—F15 are arranged in a linear array or row along the upper edge E1 of the coupon 21. The first line of the first field F1 is spaced by a distance D inwardly from the left edge E of the coupon, and the remaining fields substantially have uniform widths and spacing making the first line of a given field be spaced from the first line of the next field by a uniform distance *d*.

To facilitate transport of documents successively through business machines and to assure that the fields on each document will pass through positions of alinement with reading means to be described, the coupon 21 is formed with a series of feed or sprocket holes 22. One such feed hole 22 is provided a fixed distance below each of the fields F1—F15, and substantially alined with the center, vertical row of perforation stations in that field. By this reference spacing of the feed holes from each corresponding field, alinement of the fields with reading means in the sorter is assured.

Figure 1:
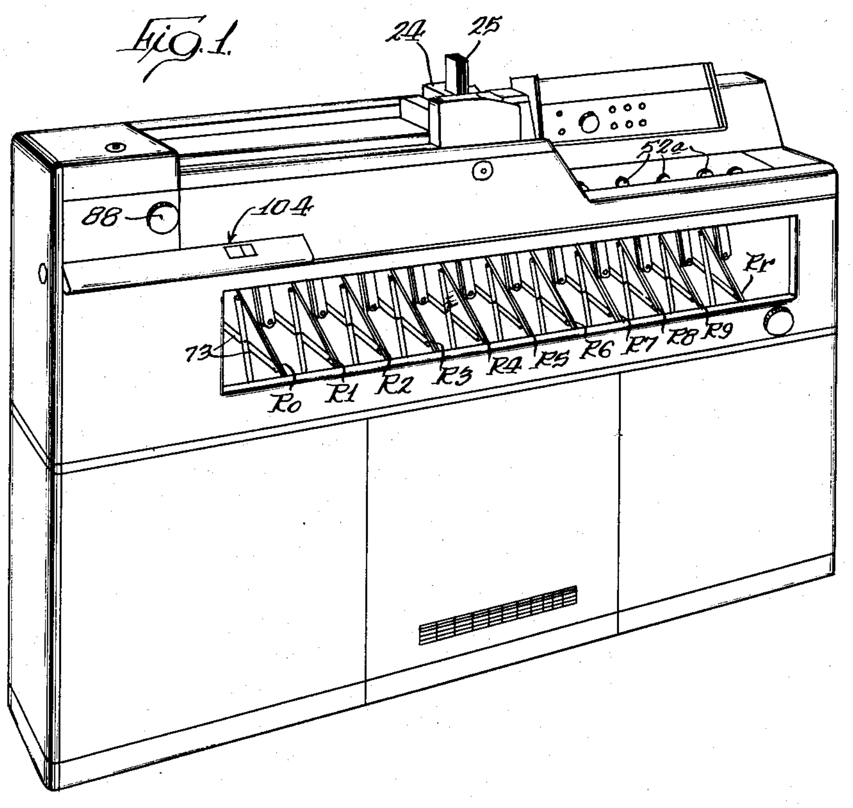
FIGURE 1 is a perspective view of a sorting machine embodying the features of the present invention.
Figure 3:
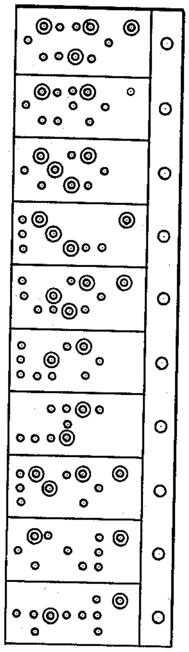
FIG. 3 shows the ten numerical characters which may be represented in any field of a document by indicia in the form of different patterns of perforations, and also shows the significant locations of perforations which by their combinations distinguish each character from the others.
Figure 5:
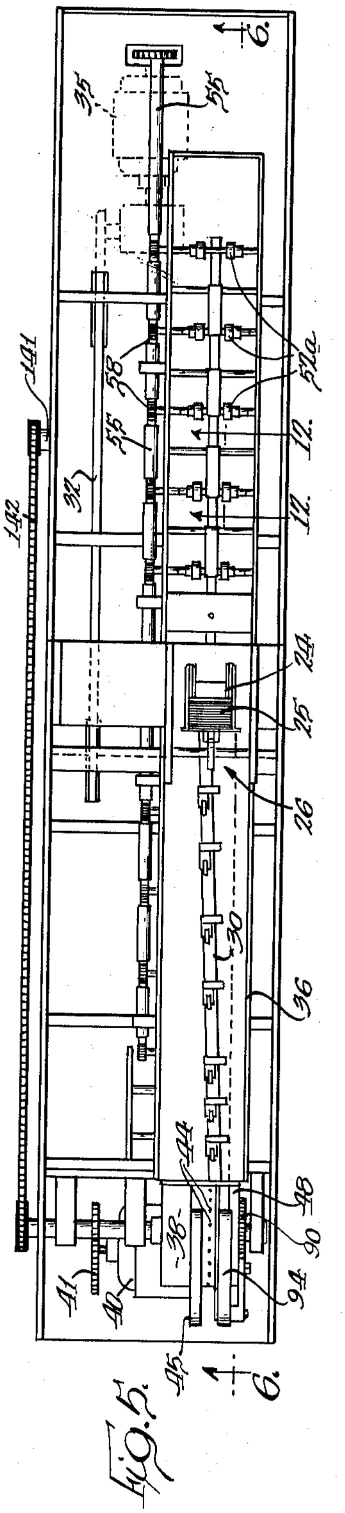
FIG. 5 is a plan view of the machine shown in FIG. 1, but with the cover or outer housing removed.

Referring now to FIGS. 1, 3 and 5, the sorter there shown includes a supply hopper 24 holding a plurality of stacked documents 25 and associated with a feeding mechanism 26 which sends the documents seriatim along a predetermined path. The path includes an upper horizontal flight 28*a* to the left (FIG. 6), an arcuate portion 28*b* adjacent a reading assembly 29, and a lower horizontal flight 28*c* to the right. As documents are fed successively from the feeder mechanism 26, they pass around the arcuate portion 28*b* of their predetermined path and then to the right along the horizontal flight 28*c*. The identity of the character in a selected one of the fields of each document is sensed or read while the documents are in the arcuate portion 28*b* of the path, and as they move along the path portion 28*c*, the documents are selectively diverted into spaced receptacles or receivers R0 through R9, each receiver corresponding to one of the numerical characters 0 through 9.

At the reading station 29, the particular one of the several possible characters 0—9 appearing in a selected one of the document fields is sensed or "read," and the resulting identifying signal is caused to actuate a corresponding one of a plurality of diverters V0—V9 just before the sensed document reaches that diverter, so that the documents are deflected from the surface or path portion 28*c* into the appropriate one of the receivers R0—R9. If any document is not diverted into one of the receivers R0—R9, it continues along the path portion or surface 28*c* until it is guided into a final reject receiver R*r*.

Figure 6:
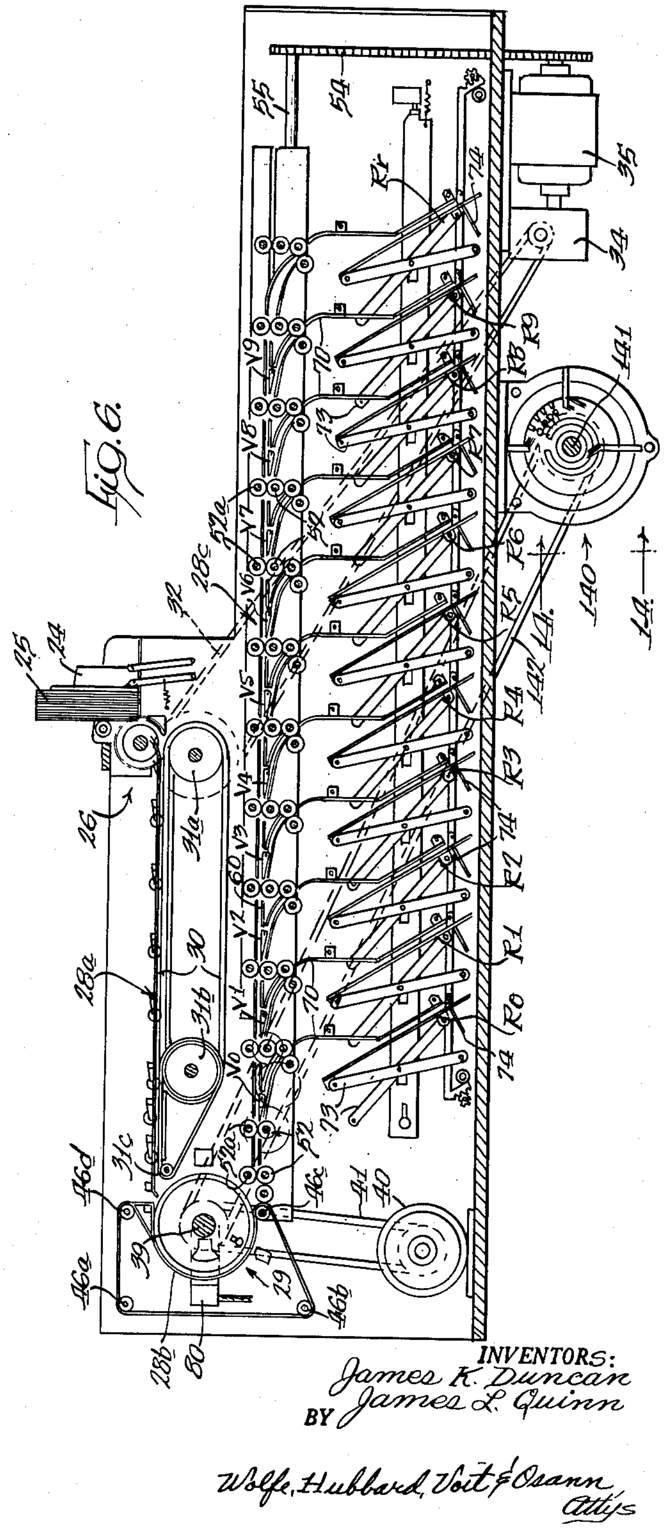
FIG. 6 is a vertical section taken substantially along the line 6—6 in FIG. 5.
Figure 8:
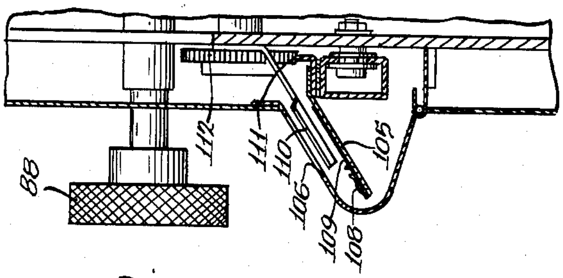
FIG. 8 is a fragmentary section taken substantially along the line 8—8 in FIG. 7, and showing the field selection indicator.

The feed mechanism 26 may take any one of a variety of forms well known to those skilled in the art, and thus need not be described in detail. It will suffice to observe that the feed mechanism passes one document at a time onto a moving belt 30 trained over pulleys 31*a*, 31*b*, 31*c* (FIG. 6). The first of these pulleys is driven by a belt 32 powered from a right angle transmission 34 connected with a motor 35, which is preferably of the constant speed or synchronous type. The successive documents are deposited face down on the angled upper flight of the belt 30 and are thus carried laterally until one edge E1 (FIG. 2) abuts a guide plate 36. The belt 30 thus presents the leading edge E of each document substantially tangentially to the surface of a rotating drum 38, and with the documents oriented such that the aray of fields is moving lengthwise along the predetermined path. A shaft 39 (FIG. 9) supporting the drum 38 is continuously driven from a motor 40 (FIG. 6) by a belt 41 trained over a pulley 42 on that shaft.

Figure 10:
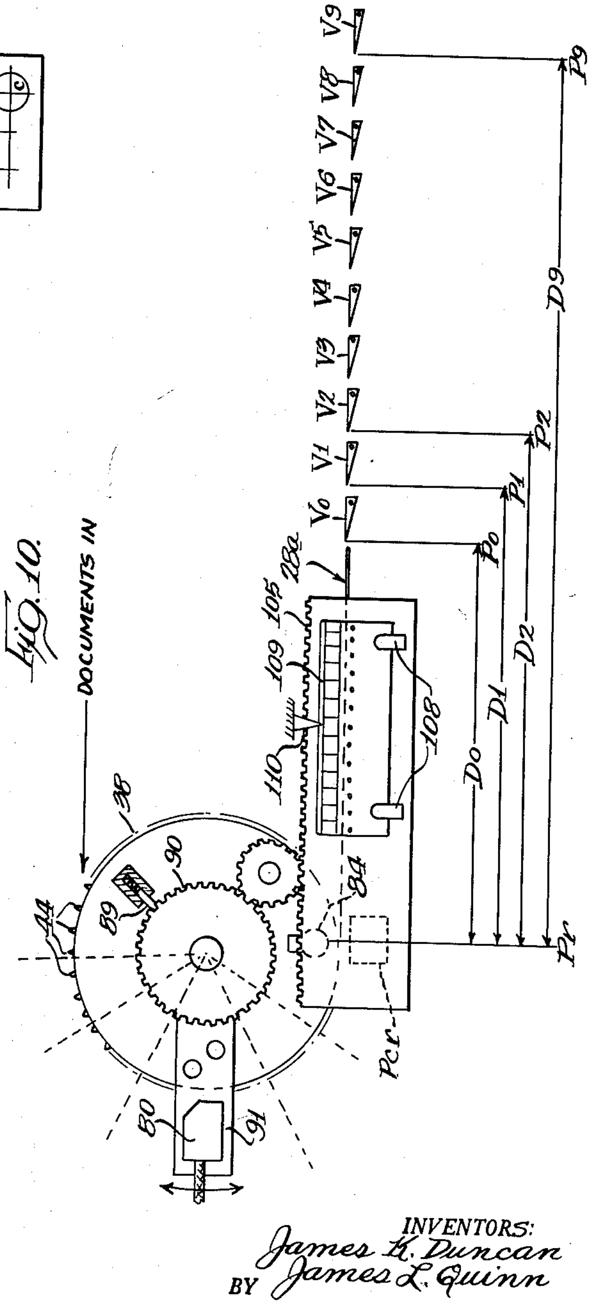
FIG. 10 is a diagrammatic illustration of the field selecting and indicating mechanism.

Referring now to FIGS. 5, 6 and 10, each document is successively engaged with the surface of the drum 38, held in curved conformity to such surface, and carried around an arc whose center is the axis of drum rotation. As each document approaches the drum face down on the belt 30, and with its longitudinal edge E1 (FIG. 2) abutted against the guide plate 36, the feed holes 22 in the document are alined with a plurality of rounded teeth 44 projecting radially from and spaced circumferentially around the rotating drum 38. The teeth 44 automatically engage in the sprocket holes 22, and thus transport each document with the drum surface. Each document is held in curved conformity against the drum surface by a travelling belt 45 trained over pulleys 46*a–d*, and pressing against an arcuate portion of the drum. As viewed in FIG. 9, the teeth 44 are adjacent one edge of the drum 38 so that the upper portion of each document containing the character fields F1–F15 axially overlies a stationary cylindrical support member 48, to be described more fully below. For further details concerning the construction and operation of the rotating drum 38 and the teeth 44 thereon which automatically engage in the feed holes of successive documents, reference may be made to Dreyer U.S. Patent No. 3,033,445, a continuation-in-part of the copending application of William H. Dreyer, Serial No. 768,408, filed October 20, 1958 and now abandoned.

Figure 11:
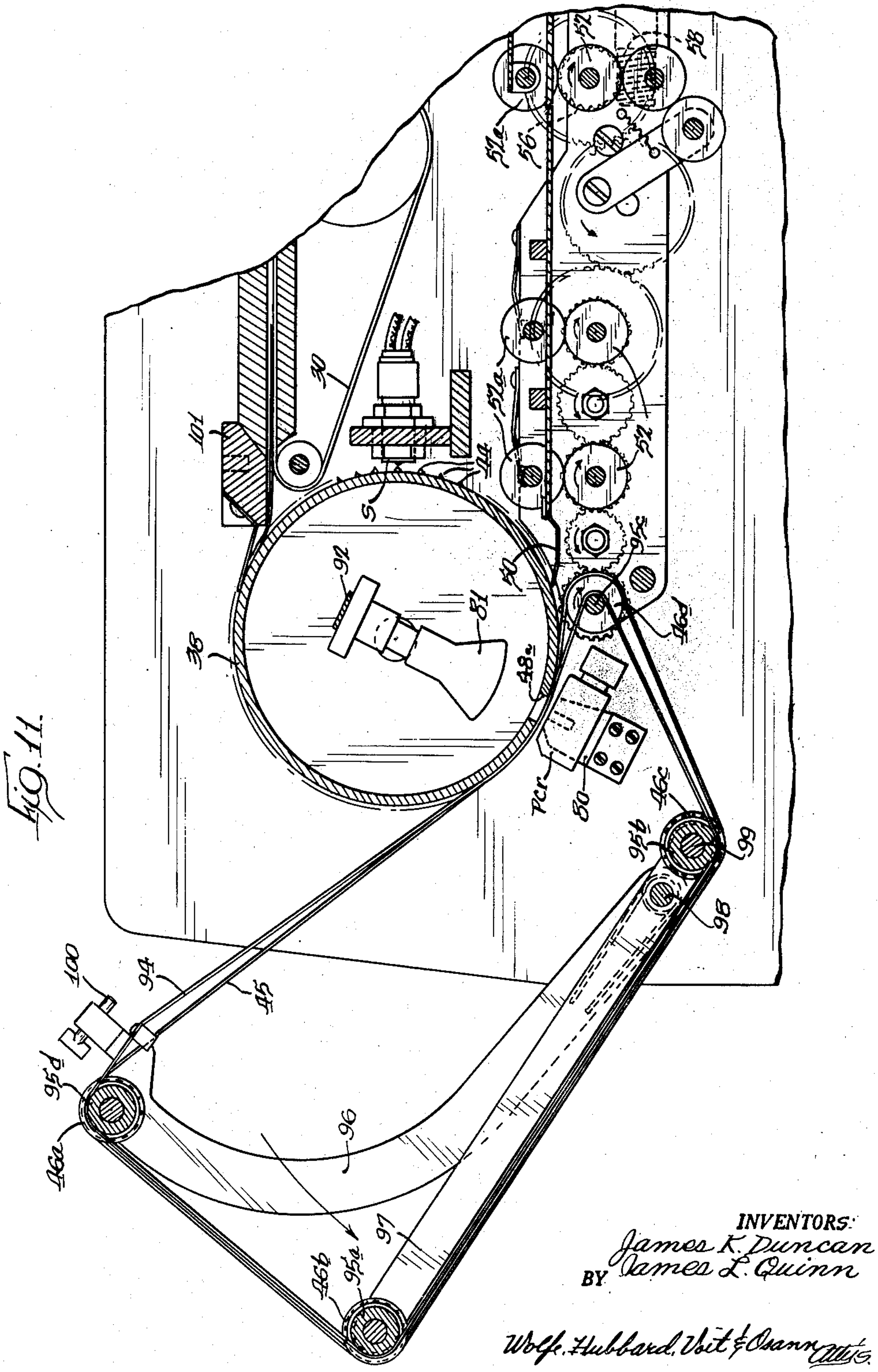
FIG. 11 is a fragmentary vertical section taken substantially along the line 11—11 in FIG. 9 and showing document-retaining belts in their relaxed position.

As each document reaches the underside of the drum 38, it is removed from the drum surface by a stripper finger 50 (FIG. 11) and guided between spaced pairs of transport rolls 52, 52*a* which advance the documents along the path or surface 28*c* (FIG. 6). The documents are thus transported, if not diverted, past the upper ends or entrances to the receptacles R0 through R9.

The lowermost transport roll 52 of each transport roll pair is rotationally driven at substantially constant speed from the motor 35. For this purpose, a chain or belt 54 is connected between the shaft of the motor and a shaft 55 which extends horizontally from the right end of the machine. As shown best in FIG. 9, the shaft 55 carries a plurality of spaced worms 56 each of which drivingly meshes with a worm wheel 58 carried at the end of a journaled shaft supporting one of the transport rolls 52. The uppermost roll 52*a* in each pair is resiliently pressed against the lower roll 52 and thus driven by the latter. The successive pairs of drive rolls 52, 52*a* are spaced apart less than the length of the shortest documents to be handled, so that the leading edge of each document engages between one pair of drive rolls before its trailing end leaves the preceding pair.

Figure 12:
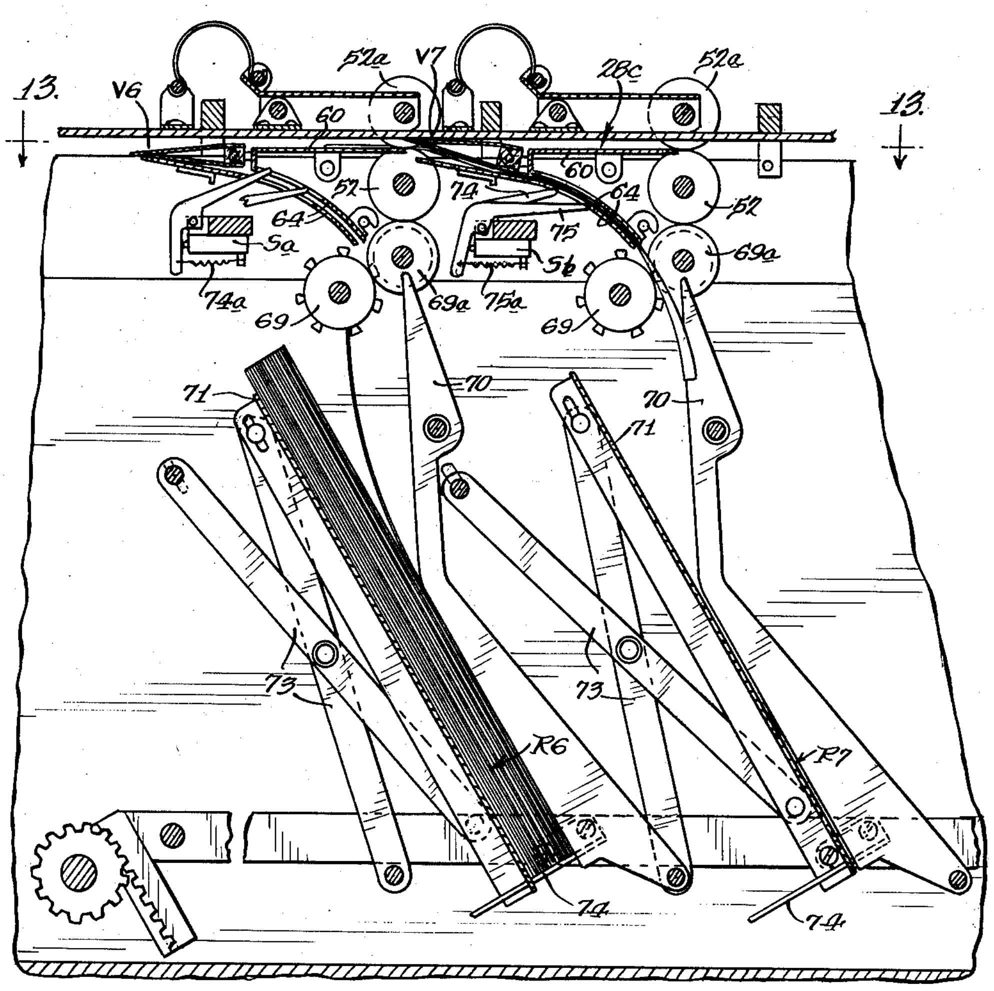
FIG. 12 is a fragmentary vertical section taken substantially along the line 12—12 in FIG. 5, and illustrating the transport mechanism, diverters, and sorted document receptacles.
Figure 14:
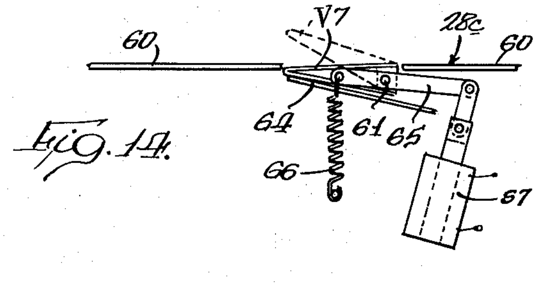
FIG. 14 is a fragmentary detail view taken substantially along the line 14—14 in FIG. 15, and showing a solenoid and linkage for actuating a diverter.

As shown best in FIGS. 6, 12 and 14, the path portion or surface 28*c* is formed by a plurality of spaced plates 60 located between the spaced diverters V0—V9. The diverters are V-shaped elements which in their lowered or unactuated positions form a part of the path or surface along which the documents are moved. Each diverter is carried by a pivoted horizontal shaft 61 (FIG. 14) so that, when actuated or rocked upwardly, its tip is raised above the adjacent plates 60. The underside of an actuated diverter will intercept and deflect the leading edge of an approaching document downwardly between a pair of curved guide plates 64 (FIG. 12).

Figure 13:
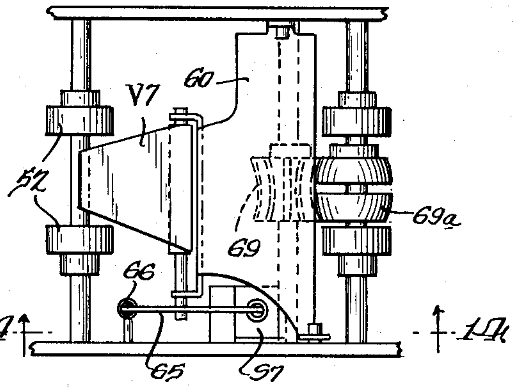
FIG. 13 is a fragmentary detail view of one diverter, taken substantially along the line 13—13 in FIG. 12.
Figure 15:
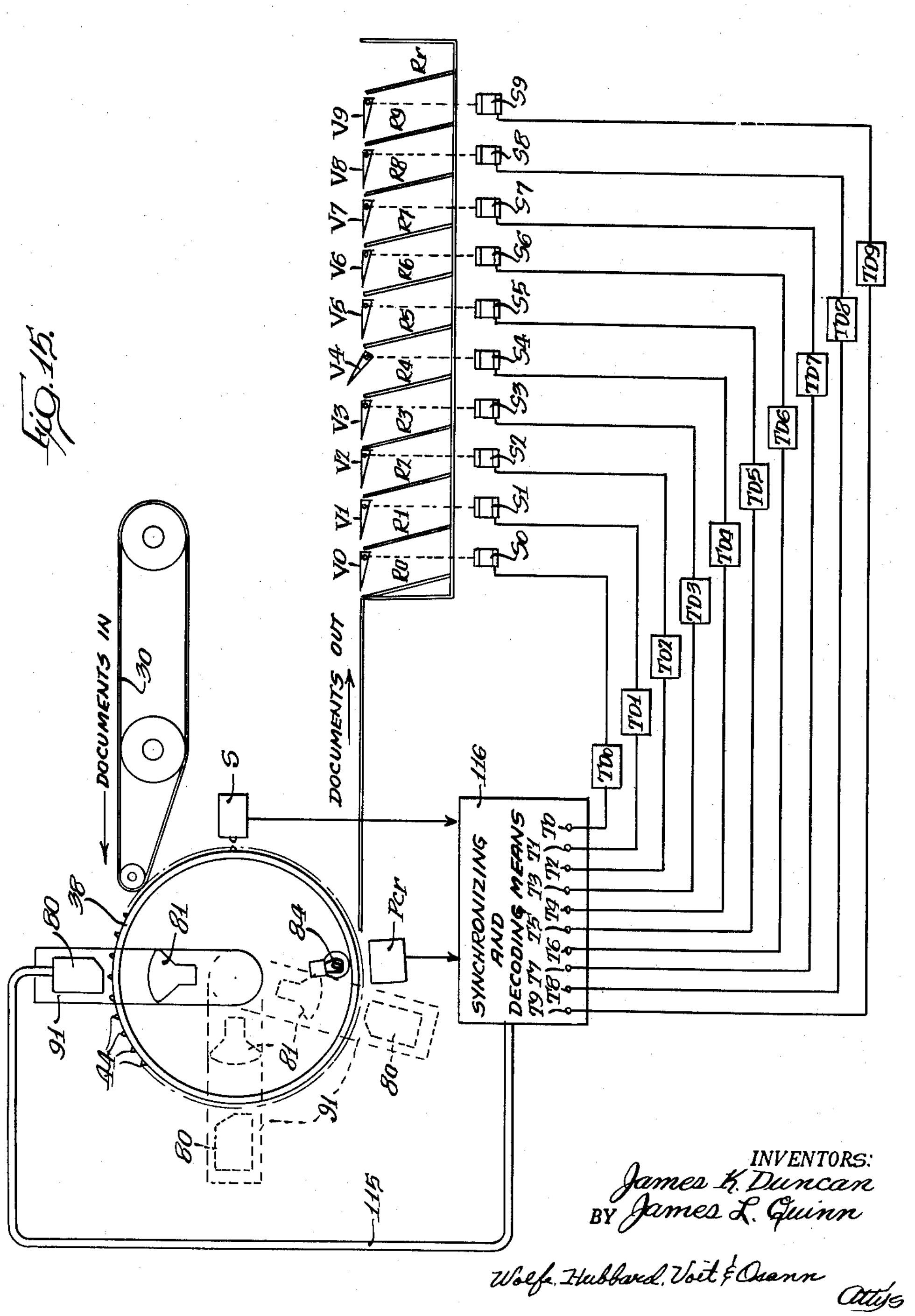
FIG. 15 is a diagrammatic illustration of the controls and interconnections between the character reading means and spaced diverters.

In order to actuate the diverters V0—V9, they are respectively associated with a plurality of solenoids S0–S9 as indicated diagrammatically in FIG. 15. As illustrated in more detail by FIGS. 13 and 14, the pivoted shaft 61 carrying the diverter V7 has a lever 65 extending therefrom. The lever 65 is biased in a counterclockwise direction by a tension spring 66 engaged at its one end, but is shifted in a clockwise direction in response to energization of the solenoid S7, that solenoid having its armature connected with the opposite end of the lever. All of the diverters V0 through V9 are associated with their respective solenoids S0—S9 in the manner exemplified by FIGS. 13 and 14. It will be apparent, therefore, that when any one of the solenoids is energized the corresponding diverter will be actuated or shifted to a raised position such as that shown for the diverter V7 in FIG. 12, where it will deflect a passing document downwardly into the associated guide plates 64.

As a document enters any pair of the guide plates 64 (FIG. 12) its leading edge will be caught between rotating pull rolls 69, 69*a* and the document will thus be moved downwardly against a deflector 70 until it is held between that deflector and a yieldable backing plate 71. The backing plate 71 is carried by pivoted links 73 which enable it to shift to the left (FIG. 12) as the number of documents between it and the deflector 70 increases. The deflector 70 and the backing member 71 together with floor plates 74 (FIG. 6) form the receptacles R0 through R9.

For a purpose to be explained below, two switches are associated with each pair of curved guide plates 64. As shown in FIG. 12, switches *Sa* and *Sb* are mounted side-by-side beneath each of these guide plates, and associated with actuating levers 74, 75 whose tips project through slots in the lowermost guide plate. The switch *Sa* associated with the diverter V6 and the switch *Sb* associated with the diverter V7 are visible in FIG. 12. As the leading edge of a document enters the curved guide passage, the first lever 74 will be deflected against a biasing spring 74*a* to actuate the first switch *Sa*. Very shortly thereafter, the second lever 75 will be similarly deflected to actuate the second switch *Sb*. When the trailing edge of the document clears the levers, the switches *Sa* and *Sb* will be restored in that order.

Figure 16:
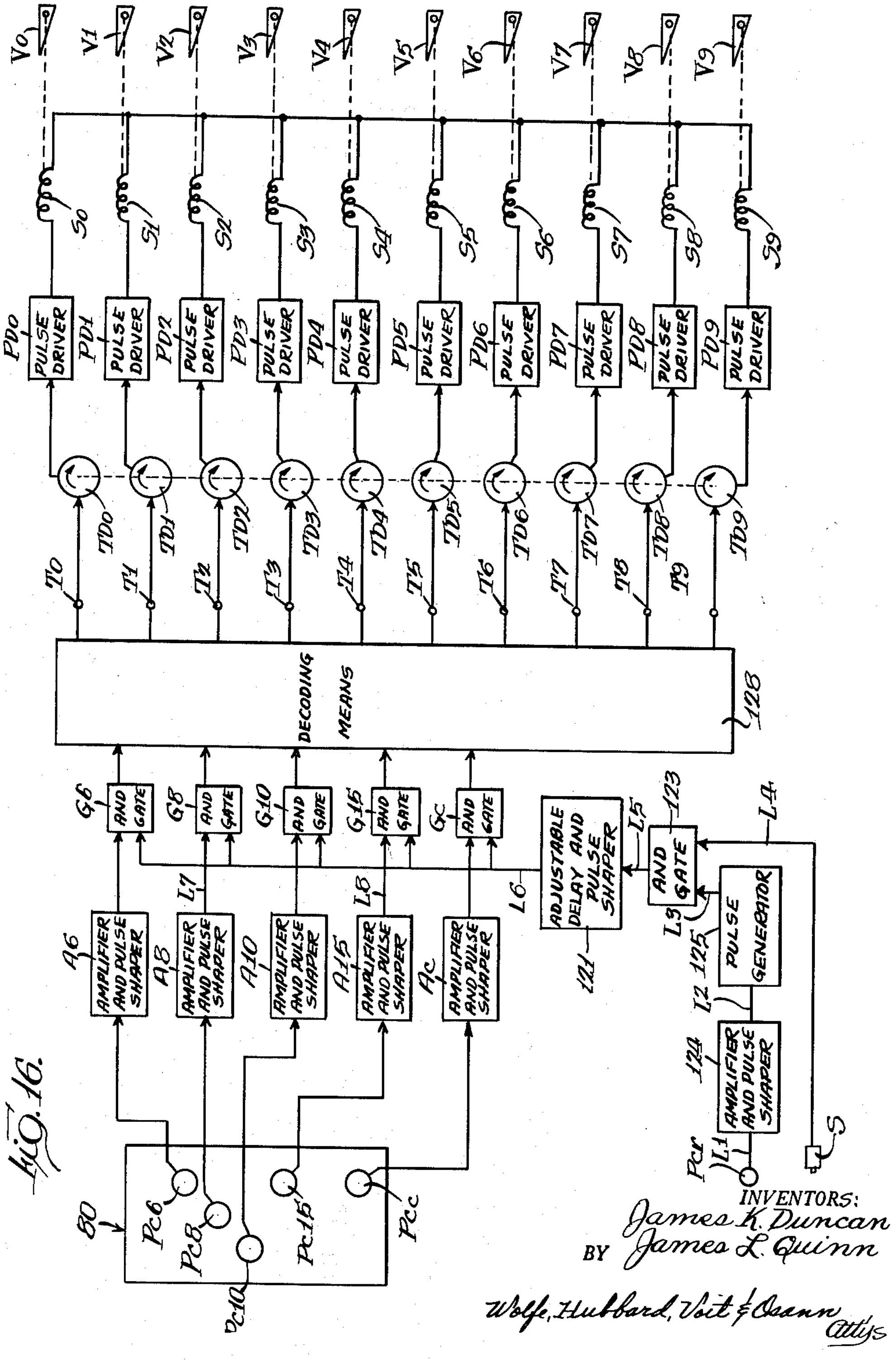
FIG. 16 is a block-and-line diagram of the electrical reading, decoding, and diverting components associated with the sorter.

In order to read and signal the identity of any character in a selected one of the fields of each document, the reading assembly 29 adjacent the drum 38 includes a reading head 80 having means to sense the presence or absence of perforations at the significant locations in a character field alined therewith. As shown in FIG. 16, the reading head 80 carries a plurality of sensing elements which preferably take the form of photosensitive diodes or photocells, such photocells being arranged at the significant locations of an imaginary perforation field. Thus, the head 80 carries five photocells PC6, PC8, PC10, PC15 and PC*c* which are spaced to register with the perforation stations 6, 8, 10 and *c* of a character field alined with the head.

Figure 9:
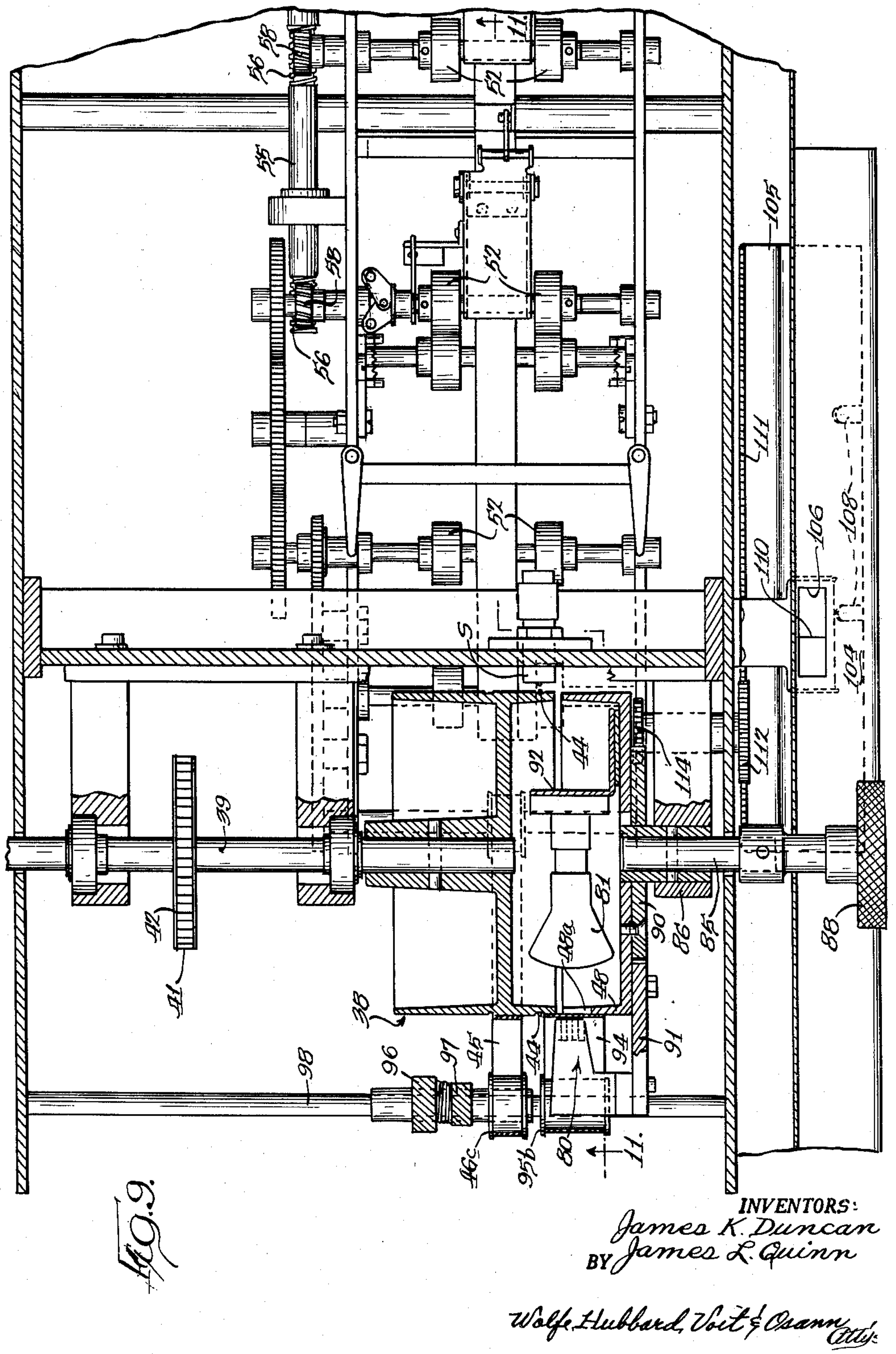
FIG. 9 is a fragmentary horizontal section taken substantially along the line 9—9 in FIG. 7.

In order that these photocells can sense the presence or absence of perforations in the corresponding significant locations of a field on a document, a light source is arranged to project light toward the face of the head 80. As shown in FIG. 9, a lamp 81 is mounted inside the cylindrically shaped support member 48, and it normally supplies light through a slot or opening 48*a* onto the face of the reading head 80. Assuming that a single field of a passing document is alined at a given instant with the imaginary field of the reading head 80, those ones of the five photocells PC6, PC8, PC10, PC15 and PC*c* which are opposite perforations in the document will receive light. Thus, if the character in the document field is a "1" the photocells PC8 and PC*c* will receive light and the remaining photocells will be masked from the light. This combination of activated photocells thus signals that the numerical character present in the field being read is a "1." Similarly, it will be apparent from FIG. 3 that a particular and unique combination of the five photocells will receive light when the respective ones of the characters 0–9 are present in a field which is alined at a given instant with the face of the reading head 80.

In accordance with the present invention, the reading head 80 is associated with means for signaling the identity of a character represented by indicia in a document field alined therewith, but only at or shortly after the instant the leading edge of the document is passing a reference point. Each such signal corresponding to any of the characters is utilized after a corresponding fixed time delay to actuate the corresponding diverter. To accomplish this, the reading means are normally disabled and are made effective in response to the leading edge of the document passing the reference point. Moreover, the reading head is mounted for adjustment to a plurality of positions or stations spaced differently along the document path from the reference point, so that it will be alined with any selected one of the fields on a document substantially at the instant the leading edge of the latter passes the reference point.

In carrying out the foregoing, the document sorter here illustrated includes a document detector or means for sensing when the leading edge of a document passes a reference point on the path described above. The reference point P*r* (FIG. 10) is disposed downstream along the path from the reading head 80 when the latter is in any of its several possible positions, but upstream relative to the diverters V0—V9. As diagrammatically shown in FIG. 10, the reference point P*r* is at the underside of the drum 38, and the document detecting means takes the form of a reference photocell PC*r* mounted below the document path in a position normally to receive light from a lamp 84 (see also FIG. 7). As the leading edge of the document passes the reference cell PC*r*, the response of the latter to the abrupt change from incident light to darkness serves to signal that the leading edge of the document has passed the reference point P*r*. To be more specific, the reference point P*r* may be considered as lying in a plane radial to the axis of the drum 38 and containing the lamp 84 and the reference cell PC*r*. The reference cell thus signals when the leading edge of a document passes a predetermined angular point on the arcuate portion of the document path.

The diverters V0—V9 are spaced downstream along the path from the reference point P*r* by different distances designated D0—D9 (FIG. 10). With documents traveling at substantially constant speed, the elapsed time required for the leading edge of the document to pass from the reference point P*r* to any point P0—P9 in front of the respective diverters V0—V9 will be proportional to the distances D0—D9.

Figure 7:
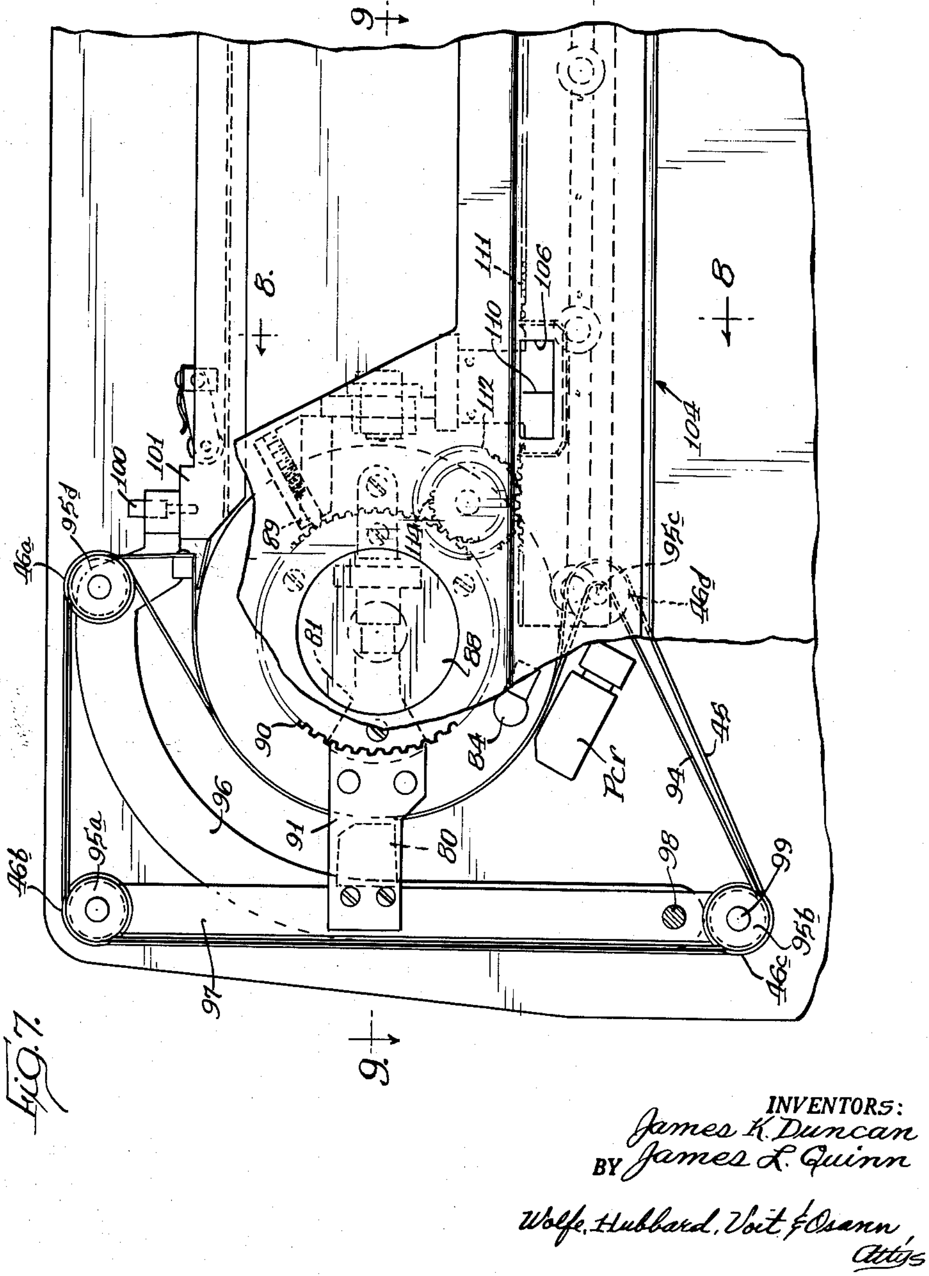
FIG. 7 is an enlarged, fragmentary view corresponding to the upper left portion of FIG. 6 and illustrating particularly the character reading assembly.

To afford adjustment of the reading head 80 to points along the document path spaced differently upstream relative to the reference point P*r*, the head is mounted on a movable support which in the present instance is the cylindrical member 48. Referring to FIGS. 7 and 9, the cylindrical member 48 is fixed on a shaft 85 journaled in a support bracket 86 and connected with a knob 88. The knob may be manually rotated to place the cylindrical member 48 in different angular positions and the head 80 at different stations spaced upstream from the reference point. The cylindrical member 48 is held in any selected position by a spring-biased detent 89 yieldably engaged with the teeth of a gear 90 bolted or otherwise fastened to the end face of the member. Bolted to the support member 48 is a radially extending arm 91 which carries the head 80 at its outer end. The face of the head 80, which contains light-transmissive apertures leading to the photocells therein, is disposed opposite the slot 48*a* cut in the member 48, so that it normally receives light from the lamp 81 which is supported by a bracket 92 fixed to the interior of the member. Each document engaged with the teeth 44 and held on the surface of the rotating drum 38 thus has its upper edge portion, containing the array character field, moved around the inner end of the cylindrical support member 48, the character fields passing over the slot 48*a* and between the inner face of the head 80 and the light source 81.

To hold the upper edge portion of passing documents in curved conformity against the surface of the cylindrical member 48, a strap 94 is trained over supports 95*a–d*. This belt is made of a clear, translucent material, such as Mylar or nylon, so that it will transmit light through perforations in a passing document to the face of the reading head 80. The translucent belt 94 and the running belt 45 may be swung outwardly from the member 48 and the drum 38 to permit removal of jammed documents. For this purpose, the pulleys 46*a*, 46*b* and the supports 95*b*, 95*a* are carried on rods extending between arms 96 and 97 respectively pivoted at 98 and 99. The displacement between the two pivots 98, 99 results in slackening of the belts 94 and 45 as the arms 96, 97 are swung outwardly. When these arms are swung inwardly to the position illustrated in FIG. 7, so that the two belts are engaged with the drum 38 and support member 48, they are retained in place by a latch 100 which snaps into a latching block 101.

Referring again to FIGS. 9 and 7, an operator may set the head 80 to a position relatively close to the reference cell PC*r* simply by turning the knob 88 counterclockwise. With the reading head 80 in the position illustrated by FIG. 11, the first field F1 (FIG. 2) on each document is alined with the head immediately after the leading edge E of the document masks the reference cell PC*r* from the associated lamp 84. Similarly, the operator may set the head 80 to other angular positions (illustrated to an exaggerated degree in diagrammatic FIG. 15) simply by turning the knob 88. FIG. 7 illustrates the reading head 80 in a station spaced considerably upstream from the reference cell PC*r*, so that it will be alined with a field spaced considerably from the leading edge of a document at the time such leading edge passes the reference cell. The detent 89 and the gear 90 which it engages are preferably constructed so that when the head 80 is set to certain ones of its positions, the spacing of the head from the reference point or cell PC*r* is equal to $D+n$, where D is the dimension shown in FIG. 2, $d$ is the spacing from field to field in the documents, and $n$ is an integral number. This arrangement assures that as the knob 88 is turned to set the head 80 at different angular positions, a selected one of the field on each document will be substantially in alinement with the head at the instant the leading edge of the document passes the reference point on reference cell PC*r*. It will thus be understood that simply by turning the knob 88 and adjusting the angular position of the head 80 an operator may locate the head so that it is opposite any one of the fifteen fields F1—F15 (FIG. 2) of a passing document when the leading edge of the latter is opposite the reference cell PC*r*.

In keeping with one feature of the present invention, means are provided to facilitate the selection of any particular document field, i.e., to permit quick and accurate location of the head 80 so that it is alined with any desired one of the document fields at the time the leading edge of the document passes the reference point. For this purpose, an indicator 104 is mounted adjacent the front of the sorting machine (FIG. 1) and is coupled with the indexable cylindrical support 48 so as to display the position or station to which the head 80 has been set.

As here shown, the indicator 104 comprises a scale and an index marker mounted for relative movement, and so connected with the cylindrical support 48 that they are relatively shifted in proportion to adjustments of the head 80. More specifically, the scale is formed as a longitudinally movable slide 105 (FIGS. 9 and 10) disposed beneath a window 106 in the machine housing. The slide has retaining clips 108 which are adapted to receive and hold a specimen document 109 (FIG. 10) similar to those being sorted. The perforation fields on the upper edge of this specimen document thus form a scale which is longitudinally movable relative to a stationary index marker 110. A rack 111 formed along the edge of the slide 105 is meshed with a pinion 112 connected to or integral with a second pinion 114. The pinion 114 is drivingly meshed with the gear 90 carried by the cylindrical support 48.

Thus, as the knob 88 is turned to adjust the position of the head 80, the gear 90 acts through the gears 114, 112 and the rack 111 to proportionately shift the slide 105 and the specimen document 109 thereon relative to the index marker 110. The index marker thus overlies and indicates on the specimen document the particular field of documents passing through the sorter which will be alined with the reading head 80 at those instants when the leading edges of the documents are passing the reference cell PC*r*. If an operator of the machine desires to sort documents on the basis of the characters appearing in any one of the fields F1—F15 he need only turn the knob 88 until that desired field of the specimen document is opposite the index marker 110, and the machine will thereafter operate only on the basis of characters appearing in that selected field.

In carrying out the invention, means are associated with the reading head to produce a unique signal or response identifying the particular character appearing in a field registered therewith. However, such reading means are normally disabled, and are enabled only for a short instant after the leading edge of a document passes the reference cell PC*r*. As illustrated in FIG. 15, the photocells PC6, PC8, PC10, PC15 and PC*c* are connected by the conductors of a cable 115 to synchronizing and decoding means shown in block form at 116. Such associated synchronizing and decoding means having a plurality of output terminals T0—T9 which respectively correspond to the various possible characters which can appear in any document field. Normally, no response is produced on these output terminals even though the photocells in the reading head 80 are illuminated or masked in various combinations as different fields and perforation patterns pass thereby. When abruptly darkened as the leading edge of the document passes it, the reference cell PC*r* supplies a signal to the synchronizing and decoding means 116, which then responds to the condition of the photocells in the reading head 80. Moreover, to assure that the selected field of a passing document is exactly alined with the head 80 at the time the condition of the photocells therein is read, a second synchronizing element S is disposed adjacent the drum 38 and connected with the decoding means 116.

The purpose of the synchronizing element S is to assure that the conditions of the photocells in the reading head 80 determine the output signal on the terminals T0—T9 only at an instant when a passing field is exactly registered with the face of the head. The element S is located adjacent the periphery of the drum 38 at a position where it will be spaced by an integral multiple of field widths from the reading head 80 when the latter is in any of its positions or stations. The synchronizing element S is mounted in the machine adjacent sprocket teeth 44, and may take the form of a magnetic, inductive pickup which produces an electric pulse each time one of the metal teeth passes thereby. Since the feed holes 22 (FIG. 2) of each document are spaced apart by a distance equal to one field width, and since those holes are each engaged by one of the correspondingly spaced teeth 44, a pulse will be induced in the pickup element S at each instant that a field on a passing document is registered with the face of the head 80.

From the foregoing general explanation, it will be apparent that as each document passes the reading head 80, only one output signal will appear on the terminals T0—T9. The particular terminal on which such output signal appears will depend upon the character which is represented by indicia in the selected document field. For example, if the character is a "4," the signal will appear on the output terminal T4. Regardless of which character is identified by an output signal, i.e., which output terminal receives it, that output signal will occur approximately at or very shortly after the instant that the leading edge E of the document passes the reference point or reference cell PC*r*.

Further in accordance with the invention, time delay means are employed to actuate the corresponding one of the diverters V0—V9 whenever an output signal identifying any of the characters 0–9 appears. The time delay interval associated with each character is made substantially proportional to the distance D0—D9 (FIG. 10) between the reference point P*r* and the corresponding diverter V0—V9. Such time delay means are diagrammatically represented at TD0—TD9 (FIG. 15) as interposed between the output terminals T0—T9 and the diverter-actuating solenoids S0—S9. All of these delay means provide predetermined, fixed delay intervals, although the particular delay interval produced by each delay means is different from that produced by the others. The time delay component TD0 will produce the shortest delay period, while the time delay components TD1—TD9 will produce progressively greater delay periods. The particular value of the delay period produced by a given one of the delay devices TD0—TD9 is chosen with reference to the velocity at which the documents move so that the leading edge of a document travels from the reference point P*r* to a position just in front of the corresponding diverter before the solenoid for that diverter is energized. As a result, each of the diverters V0—V9 is actuated by energization of its solenoid S0—S9 just before the leading edge of a document reaches that diverter after a character has been read from that document which corresponds to the diverter.

It is important to notice that each diverter V0—V9 will be actuated at the proper instant just before the leading edge of a document, whose selected field contains the corresponding character, reaches it, regardless of the particular field on that document which has been sensed and read by the head 80. That is, whether the head 80 is positioned to read the character appearing at either the first or the fifteenth field of a document, the reading action always occurs when the leading edge of the document is substantially at the reference point P*r*. Thus, the same period of time is required for any document to pass from the reference point to a given one of the diverters when the head 80 is located at any one of its possible stations or positions.

The synchronizing and decoding means briefly described above are more fully shown in FIG. 16, and the operation of the sorting apparatus may best be described with reference to that block-and-line diagram. Because the details of the circuits represented in each block in FIG. 16 form no part of the present invention, and will be readily understood by those skilled in the art, such details will not be shown or described. Reference may be made to the copending application of James L. Quinn, Serial No. 768,396, filed October 20, 1958, now Patent No. 3,033,448 for illustrations and descriptions of specific circuits.

As illustrated in FIG. 16, the five photocells PC6, PC8, PC10, PC15, and PC*c* in the reading head 80 are respectively connected to amplifiers and pulse shapers A6, A8, A10, A15, and A*c*, the latter thus producing abrupt output signals or pulses each time that their corresponding photocells momentarily receive light through a perforation in a passing document. These amplifiers are, in turn, connected to one input of five corresponding dual-input gates G6, G8, G10, G15 and G*c*. Unless signals are simultaneously received on the other inputs of these gates, however, the latter produce no output in response to the pulses coming from the amplifiers. Thus, despite the fact that the photocells in the reading head 80 may be receiving light in different combinations as a document passes the head, the reading apparatus is normally disabled since the gates are normally closed.

As shown in FIG. 16, the gates are opened at the proper instant, i.e., when the selected field is passing the reading head 80 and is exactly registered therewith, by a synchronizing signal appearing on a line L6 leading from the output of an adjustable delay and pulse shaper 121. A single pulse of predetermined duration is produced by the shaper 121 whenever an input is supplied thereto over a line L5 forming the output of a gate 123. The reference photocell PC*r* is electrically connected over a line L1 to an amplifier and pulse shaper 124 which is, in turn, connected by line L2 to a pulse generator 125 having its output leading over line L3 to the first input of gate 123. The amplifier 124 includes differentiating and clipping means so that it produces an output signal or pulse only when the cell PC*r* is abruptly darkened. Thus, each time that the leading edge of a document passes the reference cell PC*r*, and abruptly cuts off light received by that cell from the associated lamp 84, amplifier 124 produces an output response. This response triggers the pulse generator 125 so that the latter produces a lengthened pulse of predetermined duration and which "opens" the gate 123. While the gate 123 is opened, one of the teeth 44 on the drum 38 will pass the synchronizing element S and the latter will, in turn, supply a pulse over line L4 to the other input of the gate 123. The gate 123 actuates the shaper 121, and response of the latter will momentarily open all of the gates G6, G8, G10, G15 and G*c*. Thus, the gates are opened only when a selected one of the fields on each document is passing the reading head 80, and is substantially alined therewith.

The five gates G6, G8, G10, G15 and G*c* have their output terminals connected as inputs to a decoding means 128 which may take a variety of forms, preferably a diode matrix as disclosed and claimed in the aforesaid copending application of James L. Quinn, Serial No. 756,396, filed October 20, 1958, now Patent No. 3,033,448. Since the details of such decoding means are not a part of the invention here claimed, they are not here shown or described. It will suffice to observe simply that the decoding means has ten output terminals T0—T9, as previously mentioned, and each of which receives a signal or voltage pulse whenever the gates supply different combinations of input signals thereto. Thus, the reading head 80 and the photocells therein together with the associated apparatus shown in FIG. 16 will produce one output signal uniquely identifying the character appearing in a selected field of each document, that output signal appearing on the corresponding one of the terminals T0—T9 for any character 0–9.

Figure 17:
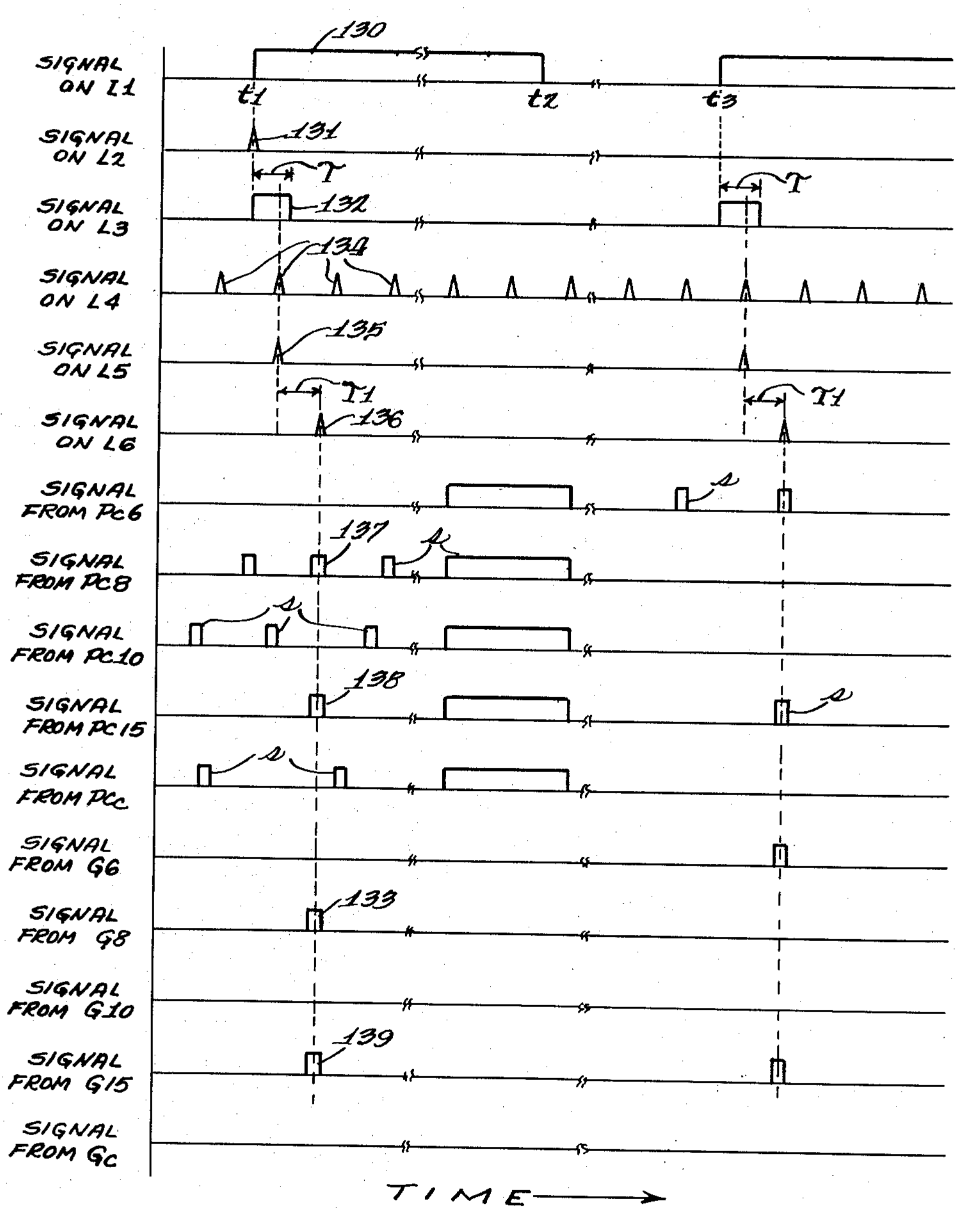
FIG. 17 is a series of graphs or curves illustrating variations of signals or voltages and different points in FIG. 16.

It will be helpful at this point to describe the operation of the components associated with the reference cell PC*r* and the synchronizing element S in more detail with reference to the graphs plotted against time in FIG. 17. The curve 130 appearing in FIG. 17 represents the signal variation which appears on the line L1 leading from the reference cell PC*r* as a document passes thereby. It will be seen that when the leading edge of a document passes the cell PC*r* at an instant *t1*, the signal rises abruptly from a lower to a higher level. The signal remains at this high level until the trailing edge of the document unmasks the cell PC*r* at a later instant *t2*.

In response to the abrupt rise of the signal appearing on the line L1, the amplifier and pulse shaper 124 in FIG. 16 produces a sharp output pulse 131 on line L2, this pulse occurring substantially at the time instant *t1*. In response to the pulse 131 appearing on its input line L2, the pulse generator 125 in FIG. 16 produces on its output line L3 a lengthened pulse 132 having a preselected time duration T. This lengthened pulse 132 is thus supplied as the enabling input to the AND gate 123.

Since the drum 38 and the teeth 44 thereon are continuously rotating, the synchronizing element S has voltage pulses periodically induced therein. Such pulses are illustrated at 134 in FIG. 17 and appear on the line L4 in FIG. 16. They are supplied to the other input of the gate 123, and the latter passes that one of the pulses 134 which coincides with the extended pulse 132, so that the output of the gate appearing on the line L5 is a single pulse 135 which appears shortly after the leading edge of each document passes the reference point or reference cell PC*r*. The delay circuit and pulse shaper 121, in response to the pulse 135, produces an output signal or pulse 136 on the line L6, this latter pulse being delayed by an interval $T_1$ from the instant that the input pulse 135 occurs.

The pulse 136 is passed over the line L6 to one input of all of the gates G6, G8, G10, G15 and G*c*. If, at the time the pulse 136 appears on the line L6, the amplifiers leading to these gates are producing output responses resulting from the associated photocells in the reading head receiving light, then those gates will be "open" and will pass input signals to the decoding means 128. It is assumed in FIG. 17 that the photocells PC8 and PC15 are receiving light and producing signals 137 and 138 at the instant that the pulse 136 appears on the line L6. This means that the amplifiers A8 and A15 are supplying response signals 137 and 138 to the gates G8 and G15. As a result, therefore, the gates G8 and G15 supply input signals 133 and 139 to the decoding means 128, while the remaining gates produce no response. The decoding means 128 thus receives an indication that a character having perforations at significant locations 8 and 15 has been read.

As shown in FIG. 3, the character "5" has perforations at significant stations 8 and 15. Thus, the decoding means 128 in response to signals 133, 139 will produce an output signal on its terminal T5, and no output signal on the remaining terminals.

As the next document passes the reference cell PC*r* and the reading head 80, a similar series of signals will occur, and a response indicative of the character appearing in the selected field of the second document will thus appear on the corresponding one of the output terminals T0—T9. As shown at the right portion of FIG. 17, the signals resulting from a second document, whose leading edge passes the reference cell PC*r* at the instant *t3*, produce outputs from gates G6 and G15. This makes the decoder 128 provide an output signal on terminal T9.

It will be understood from the foregoing examples that the decoding means 128 responds to signals from different combinations of the gates G6, G8, G10, G15 and G*c*, to signal the identity of a character having perforations in the same combination of significant perforation stations. In other words, the decoding means 128 operates to decode certain combinations of perforations sensed by the reading head, the combinations for the various characters being shown in FIG. 3.

Although the several photocells in the reading head 80 may receive light and produce random signal responses *s* (FIG. 17), these have no effect on the decoder 128 or the sorting apparatus because the reading means as a whole are made effective only when a selected field is alined with the head 80.

Any output signal appearing on one of the terminals T0—T9 is passed to a corresponding delay device TD0—TD9 symbolically represented in FIG. 16 by circles or discs. Each such delay device has an output line leading to a corresponding pulse driver PD0—PD9 which in turn is connected with a corresponding one of the actuating solenoids S0—S9. As indicated previously, the delay devices TD0—TD9 each produce a fixed, different delay interval so that the diverter corresponding to the character associated with the output terminal which feeds that delay device will be actuated just before the leading edge of a document containing the character reaches the diverter.

Although various forms of delay devices may be employed, those here shown as a preferred type are constituted by rotating discs mounting a plurality of capacitors adapted to store any received signal and release it after a predetermined time delay period. The capacitor disc time delay devices are shown generally at 140 in FIG. 6 and include a common shaft 141 which is driven at a substantially constant speed by a belt 142 from the shaft 39 which, in turn, is driven from the synchronous motor 40.

Figure 18:
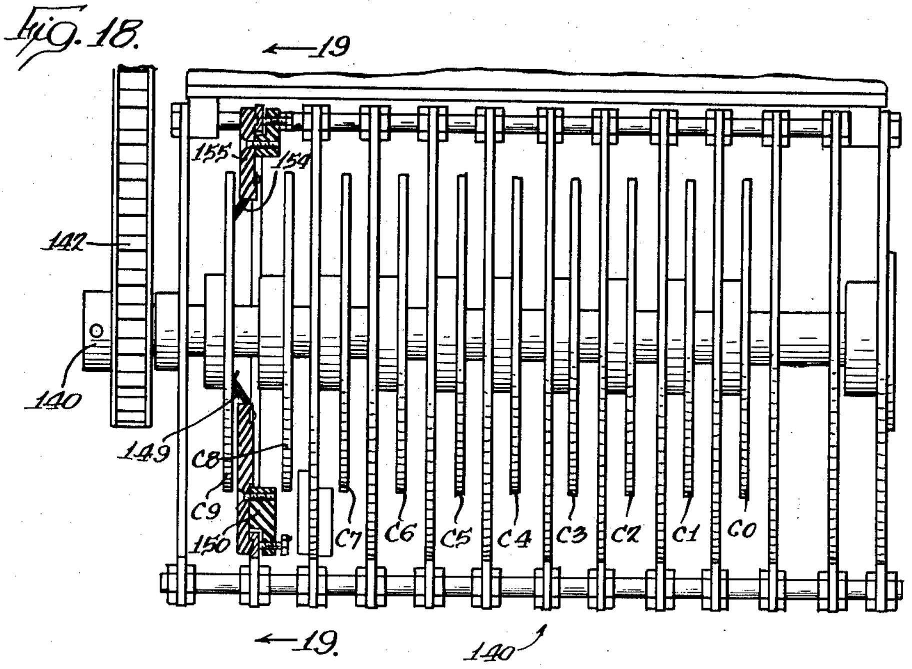
FIG. 18 is a detail elevation, partially broken away, showing a bank of capacitor discs employed for creating time delays.
Figure 19:
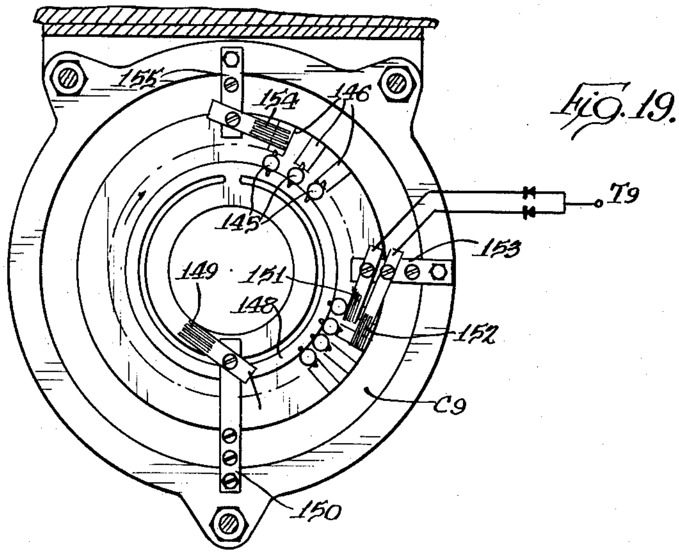
FIG. 19 is a vertical section taken substantially along the line 19—19 in FIG. 18.

As shown in FIG. 18, the shaft 140 carries a plurality of discs C0—C9 each of which corresponds to one of the ten characters 0–9. All of these discs are identical, and a description of the disc C9 with reference to FIG. 19 will suffice for all. The disc C9 (FIG. 19) carries a circular array of capacitors 145 having their input terminals electrically connected to circularly spaced conductive segments 146 disposed near the disc periphery. The opposite terminals of the capacitors 145 are connected to a conductive metal ring 148 disposed at the inner edge of the disc C9. This inner ring 148 is wiped continuously by a brush 149 mounted on a bracket 150 and connected to a point of reference or ground potential.

Figure 20:
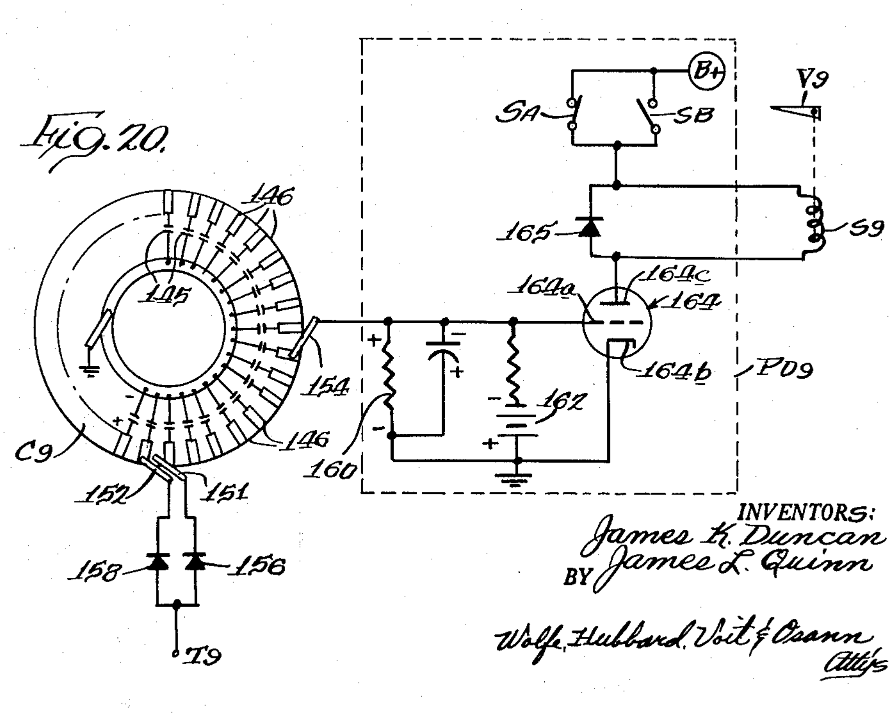
FIG. 20 is a schematic diagram showing the electrical circuits associated with one capacitor disc and diverter solenoid.

In order to receive and store a voltage pulse appearing on the terminal T9, the latter is connected to a pair of brushes 151, 152 (see also FIG. 20) which are spaced apart on an insulating bracket 153 and wipe the conductive segments 146 as the disc C9 rotates. Thus, whenever the voltage on the terminal T9 rises above ground potential, one of the capacitors 145 passing beneath the brushes 151 and 152 will be charged quickly, and will hold or store its charge until the disc C9 rotates through a predetermined angle and the segment 146 for the charge capacitor passes beneath a wiping output brush 154. The output brush 154 is fixed on a stationary bracket 155, the angular separation between the input brushes and the output brushes determining the duration of the delay interval.

The terminal T9 leads through diodes 156 and 158 (FIG. 20) to the respective input brushes 151 and 152. Two input brushes are employed so that one of the capacitors 145 will always be charged even though a signal occurs on the terminal T9 when one brush is engaged with an insulated area intermediate two of the segments 146. The diodes 156, 158 prevent the discharging of a capacitor by current flow from one input brush to the other.

After a capacitor 145 has been charged, it will hold that charge until its conductive segment comes beneath the output brush 154. At that time, the charged capacitor quickly discharges through the brush 154 which is connected through a low resistance 160 to ground. The resistance 160 forms a part of the pulse driver PD9, and the current discharge therethrough produces a voltage drop of the polarity indicated. This momentarily raises the potential of the grid 164*a* in thyratron 164, the grid normally being biased below the cut-off potential by suitable means such as a battery 162. The anode 164*c* of the thyratron is connected through the associated solenoid S9 and the switches *Sa*, *Sb* in parallel to a suitable positive voltage source, here represented conventionally by the symbol B+. Thus, each time that one of the capacitors 145 on the disc C9 discharges through the brush 154, the thyratron will be fired to energize the solenoid S9, so that the armature of the latter actuates the associated diverter V9. A diode 165 in parallel with the solenoid S9 shunts the inverse voltage induced therein when the energizing circuit is broken.

The functions of the switches *Sa* and *Sb*, mentioned above, may now be made clear. As soon as the leading edge of a document is deflected by the diverter V9 down into the guide plates 64 (FIG. 12) the leading edge of the document will cause the normally closed contacts of the switch *Sa* to open. This interrupts the anode circuit for the thyratron 164 and extinguishes the latter. The solenoid S9 is thus deenergized and the diverter V9 returned to its unactuated position. By this time, however, the leading edge of the document has passed into the pull rollers 69, 69*a* (FIG. 12) so that that document is moved into the associated receptacle. The switch *Sb* is actuated so that its normally open contacts are closed very shortly after the switch *Sa* is actuated. It is released and deactuated when the trailing end of the diverted document clears the associated lever 75. The function of the switch *Sb* is to establish a complete circuit so that the thyratron 164 may be energized a second time in response to reading of a second document while a first document is still passing the lever 74 (FIG. 12) and holding the contacts of the switch *Sa* open. By this provision, two successive documents containing the character "9" in the selected field can be diverted into the same receptacle.

Since the capacitor disc C9 is rotating at substantially constant angular speed, there will be a fixed time interval or delay between the instant that a signal is received on the terminal T9 and the instant that a capacitor charged by that signal is discharged through the brush 154 to fire thyratron 164. The duration of this delay interval is determined by the angular spacing or separation between the input brushes 151, 152 and the output brush 154. Since, as previously noted a relatively long time delay interval is required between the instant of reading and the instant of actuation for the diverter V9, this angular separation is shown as being relatively great in FIGS. 19 and 20. However, to produce shorter delay intervals required from the other capacitor discs C0—C8, the angular separation of their input and output brushes is made less. This is illustrated in FIG. 16 where the discs representing the time delay devices TD0—TD9 are shown as having their input and output leads separated by progressively greater angular distances. Thus, it will be apparent that the capacitor disc C0 has its input and output brushes separated by a relatively small arc so as to produce a relatively short time delay interval. The capacitor disc C1 has its input and output brushes separated by a slightly larger angle, and thus produce a slightly longer time delay interval. Simply by differentially spacing the input and output brushes for the respective capacitor discs C0—C9 the required different delay intervals between the instant of reading a character and the instant diverter actuation is obtained for all of the several characters 0 through 9.

From the foregoing, it will be apparent that the present invention makes possible the sorting of documents according to the identity of a character represented in a selectable one of a plurality of linearly arrayed fields. The reading means are adjustable to stations spaced differently from a reference point, and are rendered effective only when the leading edge, or some other predetermined portion, of each document passes the reference point. Because the linear array of fields is passing lengthwise along the path of movement, the particular field which is read depends upon the adjusted setting of the reading head. And because the selected field is always read when the leading edge of the document is passing the reference point, fixed time delays corresponding to each character result in the corresponding diverter being actuated just before the leading edge of a document reaches the receptacle into which it must be deflected. As a result, the documents may be fed in very closely spaced succession through the sorter, one or more documents passing over unactuated diverters while a succeeding document is being read by the reading means. Not only is the apparatus simple in requiring fixed delay means, but it is also very fast and accurate in its sorting operation.

We claim:

1. In apparatus for diverting documents at different ones of $m$ points along a path over which they are moved according to the particular one of $m$ characters represented in a selectable one of a linear array of fields on the documents, the combination comprising means defining a reference point on said path upstream relative to said $m$ points, means on said path spaced from said reference point for reading and uniquely signaling the identity of a character represented in the document field alined with the reading means substantially at the instant a predetermined portion of that document passes said reference point, means for adjusting the spacing between said reference point and said reading means, and means for diverting each document from said path after one of $m$ time delay periods from the instant of signaling of a character by said reading means, each of said time delay periods being different and corresponding to one of said $m$ characters.

2. In apparatus for sorting documents according to the particular one of $m$ characters represented in a selectable one of a linear array of fields thereon, the combination comprising, normally disabled means for reading and uniquely signaling the identity of a character in a field alined therewith, means for feeding documents seriatim along a path with the fields successively passing said reading means, means defining a reference point on said path spaced from said reading means, means for adjusting the position of said reading means relative to said reference point, means for momentarily enabling said reading means in response to a predetermined portion of a document passing said reference point, and means responsive to signaling by said reading means of different ones of said characters for diverting a document from said path after corresponding, different time delay periods.

3. In apparatus for sorting documents according to different characters represented thereon by indicia disposed in a linear array of character fields, the combination comprising means for reading the indicia in a field registered therewith and signaling the identity of the character represented in the field, a plurality of spaced diverters each corresponding to one character, means for transporting the documents seriatim along a path which leads the array of character fields lengthwise past said reading means and then successively past said deflectors, means defining a reference point on said path upstream of said deflectors and spaced from said reading means, means responsive to an output signal from said reading means representing any character for actuating the corresponding one of said deflectors after a time delay which is substantially proportional to the distance between said reference point and the corresponding deflector, means for adjusting the spacing between said reading means and said reference point so that a selected field is registered with said reading means immediately after a predetermined portion of each document passes said reference point, means for normally disabling said reading means, and means for momentarily enabling said reading means immediately after the predetermined portion of each document passes said reference point.

4. In apparatus for sorting documents according to any one of $m$ characters represented thereon by indicia disposed in a linear array of character fields, the combination comprising means for reading the indicia in a field registered therewith, said reading means having $m$ output terminals and means for signalling on each output terminal the reading of a respective one of said characters, a plurality of $m$ spaced diverters each corresponding to one of said characters, means for transporting documents seriatim along a path which leads the array of character fields of each document lengthwise past said reading means and successively past said deflectors, a document detector disposed on said path between said reading means and said deflectors, means for adjusting the spacing between said reading means and said detector, means for normally disabling said reading means, means responsive to said detector for enabling said reading means to read the next field registered therewith after the leading edge of each document passes the detector, a plurality $m$ of time delay devices each having an input and an output and producing a delay proportional to the distance between said detector and a corresponding one of said diverters, means connecting the input of respective ones of said delay devices to a corresponding one of said reading means output terminals, and means connected to the output terminal of each said delay device for actuating the corresponding one of said diverters.

5. In apparatus for sorting documents according to the particular one of $m$ characters represented in a selectable one of a linear array of fields thereon, the combination comprising a reading head including means to sense the identity of a character in a field alined therewith, means for feeding documents successively along a path past said reading head so that the fields on each document successively pass the head, reference means disposed at a reference point on said path downstream of said head for signaling when the leading edge of each document passes the reference point, means for adjusting said head along said path relative to said reference point, means associated with said head for signaling the identity of the character in a field alined therewith immediately following a response of said reference means, means for storing each output signal of said last means, means for releasing the stored output signal after a time delay period uniquely corresponding to the character represented by that signal, and means for diverting the document from said path in response to the release of a stored output signal.

6. In apparatus for sorting documents according to the particular one of $m$ characters appearing in a selectable one of a linear array of fields thereon, corresponding edges of adjacent fields on each document being spaced apart by a distance $d$ and the first field being spaced from one edge of the document by a distance D, the combination comprising reading means for signaling the identity of the character in a field alined therewith, a plurality of $m$ diverters spaced apart from one another, means for feeding documents seriatim so that the fields on each document successively pass said reading means and move along a path successively passing said diverters, means defining a reference point on said path between said head and said diverters, means for adjusting said reading means to positions at which its upstream spacing along said path from said reference point is $D+nd$ (where $n$ is a whole number) so that any selected field on a document is substantially alined with the reading means when the leading edge of that document passes the reference point, and means responsive to the character signaled by said reading means immediately after the leading edge of a document passes said reference point for actuating the corresponding one of said diverters, said last-named means including means for delaying the actuation of each diverter by a time period which is proportional to the distance of that diverter from said reference point.

7. In apparatus for sorting documents according to the particular one of $m$ characters appearing in a selectable one of a linearly spaced array of character fields thereon, the combination comprising a drum and means for rotating it about its axis, a plurality of $m$ spaced, normally deactuated diverters each corresponding to one of said characters, means for feeding documents successively to said drum so that they are carried through an arc on the surface thereof, means for feeding documents leaving said drum along a path successively passing said diverters, means defining a reference plane radial to the axis of said drum intercepting said path upstream relative to said diverters, means for sensing when a predetermined portion of each document passes said reference plane, a reading head, means mounting said reading head adjacent the surface of said drum with freedom for adjustment to different arcuate positions relative to said reference plane, means including said reading head for signaling the identity of a character alined therewith immediately after a response by said sensing means, time delay means for actuating the corresponding one of said diverters in response to the signaling of any of said characters, said delay means including means producing a delay interval substantially proportional to the distance between said reference plane and the diverter to be actuated.

8. In apparatus for sorting documents according to the particular one of $m$ possible characters appearing in a selectable one of a linearly spaced array of character fields on the documents, the combination comprising a drum and means for rotating the same about its axis, means for successively engaging documents on said drum so that they are carried on the surface thereof through an arc and with the array of character fields disposed circumferentially on the drum surface, means for stripping documents from the drum surface and transporting them successively along a predetermined path, a reference photocell mounted at a predetermined angular position relative to the drum axis, a light source mounted to illuminate said reference photocell except when masked by a document passing said angular position, a support member rotatable about said axis to different angular positions, a reading head mounted on said support member and movable to different angular positions upstream of said predetermined angular position, means including said reading head and responsive to said reference photocell for producing one of $m$ output signals identifying the character in a field opposite said head just after light has been masked from such photocell, a plurality of $m$ time delay devices each producing a different delay period, means for supplying said $m$ output signals to respective ones of said delay devices, a plurality of $m$ normally deactuated diverters spaced along said predetermined path downstream from said reference photocell, and means responsive to said delay devices for actuating corresponding ones of said diverters.

9. In apparatus for sorting documents according to the particular one of $m$ characters represented in a selectable one of a linear array of fields thereon, the combination comprising, normally disabled means for reading and uniquely signaling the identity of a character in a field alined therewith, means for feeding documents seriatim along a path past said reading means, means defining a reference point on said path spaced from said reading means, means for adjusting the position of said reading means relative to said reference point, means for momentarily enabling said reading means in response to a predetermined portion of each document passing said reference point, means responsive to signaling by said reading means of different ones of said characters for diverting a document from said path after corresponding, different time delay periods, a scale and an index marker, and means for relatively moving said scale and marker in proportion to adjustments in the position of said head, thereby to indicate the particular field which is selected.

10. In apparatus for sorting documents according to characters represented thereon by indicia disposed in a linear array of character fields, the combination comprising means for reading the indicia in a field registered therewith and signaling the identity of the characters represented in the field, a plurality of spaced deflectors each corresponding to one character, means for transporting the documents seriatim along a path which leads the character fields lengthwise past said reading means and then successively past said deflectors, means defining a reference point on said path intermediate said reading means and said deflectors, means responsive to an output signal from said reading means representing any character for actuating the corresponding one of said deflectors after a time delay which is substantially proportional to the distance between said reference point and the corresponding deflector, means for adjusting the spacing between said reading means and said reference point so that a given field is registered with said reading means immediately after the leading edge of a document passes said reference point, means for normally disabling said reading means, means for momentarily enabling said reading means immediately after the leading edge of each document passes said reference point, a specimen document having an array of fields thereon, an index marker adjacent said specimen document and movable relative to the fields thereon, and means for relatively shifting said specimen document and marker in proportion to adjustments in the spacing between said reading means and reference point, thereby to indicate the selected field.

11. In apparatus for sorting documents according to the particular one of $m$ possible characters appearing in a selectable one of a linearly spaced array of character fields on the documents, the combination comprising a drum and means for rotating the same about its axis, means for successively engaging documents on said drum so that they are carried on the surface thereof through an arc and with the array of character fields disposed circumferentially of the drum surface, means for stripping documents from the drum surface and transporting them successively along a predetermined path, a reference photocell mounted at a predetermined angular position relative to the drum axis, a light source mounted to illuminate said reference photocell except when masked by a document passing said angular position, a support member rotatable about said axis to different angular positions, a reading head mounted on said support member and movable to different angular positions upstream of said predetermined angular position, means including said reading head and responsive to said reference photocell for producing one of $m$ output signals identifying the character opposite said head just after light has been masked from such photocell, a plurality of $m$ time delay devices each producing a different delay period, means for supplying said $m$ output signals to respective ones of said delay devices, a plurality of $m$ normally deactuated diverters spaced along said predetermined path, means responsive to said delay devices for actuating corresponding ones of said diverters, a scale and an index marker movable relative to one another, and means including a gearing connection from said rotatable support member for moving said scale relative to said marker in proportion to adjustments of said support member, thereby to indicate the selected field.

12. In apparatus for sorting documents according to the particular one of $m$ characters represented by indicia in a selectable one of a linear array of fields on the documents, the combination comprising a plurality of $m$ normally deactuated diverters spaced along a path, means for feeding documents seriatim along said path, means defining a reference point on said path upstream of said diverters, a reading head adjacent said path spaced from said reference point, means for adjusting said head to positions spaced differently relative to said reference point so that a selectable one of the fields on a passing document is alined with the head substantially at the instant a predetermined portion of the document passes said point, means including said reading head for signaling the identity of a character in a field alined with said head substantially at the instant the predetermined portion of a document passes said reference point, a plurality of $m$ discs and means for rotating the same about their axes at a substantially constant speed, means on each disc for storing a signal at substantially any angular location, read-in means and read-out means stationary adjacent to each disc and separated by a different angle for respective ones of the discs, connections from said signaling means to transfer signals representing different ones of said characters to respective ones of said read-in means, and means responsive to an output from said read-out means for momentarily actuating respective ones of said diverters.

13. In apparatus for sorting documents according to the particular one of $m$ characters represented by indicia in a selectable one of a linear array of fields on the documents, the combination comprising a plurality $m$ of normally deactuated diverters spaced along a path, means for feeding documents seriatim along said path, means defining a reference point on said path upstream of said diverters, a reading head adjacent said path spaced from said reference point, means for adjusting said head to positions spaced differently relative to said reference point so that a selectable one of the fields on a passing document is alined with the head substantially at the instant a predetermined portion of the document passes said point, means including said reading head for signaling the identity of a character in a field alined with said head substantially at the instant the predetermined portion of a document passes said reference point, a plurality of $m$ discs each corresponding to one of said diverters, means for rotating said discs about their axes at a substantially constant speed, means on each disc for storing a signal applied at substantially any angular point thereon, stationary means adjacent each said disc for reading-in and reading-out signals to and from storage, the angular spacing between said reading-in and reading-out means for each disc being proportional to the distance between said reference point and the diverter which corresponds to that disc, connections from said signaling means to transfer signals representing different ones of said characters to the reading-in means for the corresponding discs, and means responsive to an output by said reading-out means for momentarily actuating respective ones of said diverters.

14. In apparatus for sorting documents according to the particular one of $m$ characters represented by indicia in a selectable one of a linear array of fields on the documents, the combination comprising a plurality $m$ of normally deactuated diverters spaced along a path, means for feeding documents seriatim along said path, means defining a reference point on said path upstream of said diverters, a reading head adjacent said path upstream from said reference point, means for adjusting said head to positions spaced differently from said reference point so that a selectable one of the fields on a passing document is alined with the head substantially at the instant the leading edge of the document passes said point, means including said reading head for signaling the identity of a character in a field alined with said head substantially at the instant the leading edge of a document passes said reference point, a plurality of discs rotationally driven at a substantially constant speed, a plurality of capacitors on each disc with their input terminals disposed in a closely spaced circular array, stationary input and output brushes mounted adjacent each disc to electrically wipe the capacitor input terminals thereon, said input and output brushes for respective ones of said discs being separated by respectively different arcuate distances, means connecting said signaling means to supply a charging current to respective ones of said input brushes when different ones of said characters are signaled, means connected with said output brushes for discharging any charged capacitor on the associated discs, and means for momentarily actuating the corresponding one of said diverters in response to discharge of a capacitor on any one of said discs.

15. In apparatus for sorting documents according to the particular one of $m$ characters represented by indicia in a selectable one of a linear array of fields on the documents, the combination comprising a plurality of $m$ normally deactuated diverters spaced along a path, means for feeding documents seriatim along said path, means defining a reference point on said path upstream of said diverters, a reading head adjacent said path upstream from said reference point, means for adjusting said head to positions spaced differently upstream from said reference point so that a selectable one of the fields on a passing document is alined with the head substantially at the instant the leading edge of the document passes said point, means including said reading head for signaling the identity of a character in a field alined with said head substantially at the instant the leading edge of a document passes said reference point, a plurality of $m$ discs rotationally driven at a substantially constant speed, each of said discs corresponding to one of said characters and one of said diverters, a plurality of capacitors on each disc, a circular array of spaced conductive segments on each disc, a conductive ring on each disc, means connecting one terminal of each capacitor to one of said segments with the other terminal to said ring, means electrically connecting said ring to a point of reference potential, stationary input and output brushes mounted adjacent each disc to electrically wipe the conductive segments thereon, said input and output brushes for respective ones of said discs being separated by respectively different arcuate distances which are substantially proportional to the distances between said reference point and the corresponding ones of said diverters, means connecting said signaling means to supply a charging current to respective ones of said input brushes when different ones of said characters are signaled, means connected with said output brushes for discharging any charged capacitor on the associated discs, and means for momentarily actuating the corresponding one of said diverters in response to discharge of a capacitor or any one of said discs.

16. In apparatus for signaling the identity of the particular one of $m$ characters appearing in a selectable one of a linearly spaced array of fields on documents, the combination of means for feeding documents successively with the array on each moving lengthwise along a predetermined path, reference means for signaling when a predetermined portion of each document passes a predetermined reference point on said path, a reading head, means for adjusting said head to positions spaced differently relative to said reference point, means associated with said head for signaling the identity of a character in a field alined with the head immediately after signaling by said reference means, an indicator having a scale and an index marker movable relative to one another, and means for relatively moving said scale and marker in proportion to adjustment of said head to different positions.

17. In apparatus for signaling the identity of the particular one of $m$ characters appearing in a selectable one of a linearly spaced array of fields on documents, the combination comprising means for feeding documents successively along a predetermined path and with the arrays thereon moving lengthwise, normally disabled means for reading and signaling the identity of a charcater in a field alined therewith, means defining a reference point on said path spaced from said reading means, means mounting said reading means for adjustment to positions spaced by different distances along said path relative to said reference point, means for enabling said reading means to read the character field next alined therewith in response to a predetermined portion of each document passing said reference point, a specimen document, an index marker adjacent said specimen document and movable relative to the specimen document and the fields thereon, and means connected with said mounting means for relatively moving said specimen document and index marker in proportional adjustments to the position of said head, thereby to indicate the selected field which is read by the reading means.

18. In apparatus for signaling the identity of characters appearing in a selectable one of a linearly spaced array of fields on documents, the combination comprising a drum and means for rotating the same about its axis, means for successively engaging documents on the surface of said drum to be transported through an arc with the arrays moving lengthwise, a reading head adjacent the surface of the drum, means for adjusting said head to different angular positions about said axis and having different distances from a reference position, means for signaling when a predetermined portion of each document passes said reference position, means including said reading head for emitting a signal corresponding to the character in a document field alined with the head immediately after a response by said signaling means, a specimen document, a movable support for said specimen document, a gearing connection between said head and said support, and an index marker adjacent the specimen document, so that when the head is adjusted to different positions the marker indicates on the specimen the selected field which will be read from documents passing thereby.

19. In apparatus for signalling the identity of the particular one of *m* characters appearing in a selectable one of a linearly spaced array of fields on a document, the combination of means for feeding documents successively with the array on each moving lengthwise along a predetermined path, reference means for signalling when a predetermined portion of each document passes a predetermined reference point on said path, a reading head, means for adjusting said head to positions spaced differently relative to said reference point, and means associated with said head for signalling the identity of a character in a field alined with the head immediately after signalling by said reference means.

References Cited in the file of this patent

UNITED STATES PATENTS

| | | |
|---|---|---|
| 2,294,679 | Maul | Sept. 1, 1942 |
| 2,373,247 | Jones | Apr. 10, 1945 |
| 2,731,200 | Koelsch | Jan. 17, 1956 |
| 2,936,886 | Harmon | May 17, 1960 |
| 2,952,839 | Capanna | Sept. 3, 1960 |